(12) United States Patent
Fromm et al.

(10) Patent No.: US 10,086,518 B1
(45) Date of Patent: Oct. 2, 2018

(54) SPRING LOADED IRIS MECHANISM STACK GRIPPER

(71) Applicant: XEROX CORPORATION, Norwalk, CT (US)

(72) Inventors: Paul M Fromm, Rochester, NY (US); Jeffrey J Bradway, Rochester, NY (US); Erwin Ruiz, Rochester, NY (US); Linn C Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/477,478

(22) Filed: Apr. 3, 2017

(51) Int. Cl.
| | | |
|---|---|---|
| *B25J 15/02* | (2006.01) | |
| *B25J 15/08* | (2006.01) | |
| *B25J 15/10* | (2006.01) | |
| *B25J 15/00* | (2006.01) | |
| *H01L 21/687* | (2006.01) | |
| *H01L 21/677* | (2006.01) | |

(52) U.S. Cl.
CPC ........... *B25J 15/0206* (2013.01); *B25J 15/08* (2013.01); *B25J 15/10* (2013.01); *B25J 15/00* (2013.01); *B25J 15/009* (2013.01); *B25J 15/024* (2013.01); *H01L 21/67742* (2013.01); *H01L 21/68707* (2013.01)

(58) Field of Classification Search
CPC ..... B41J 3/4073; B41J 2/04501; B29D 30/06; B29D 30/0629; B29D 30/0603; B66C 1/44; B66C 1/54; B66C 1/56; B25J 15/0206; B25J 15/08; B25J 15/10; B25J 15/009; B25J 15/00; B25J 15/024; H01L 21/68707; H01L 21/67742
USPC ..................................................... 294/93, 94
See application file for complete search history.

(56) References Cited

U.S. PATENT DOCUMENTS

| | | | | |
|---|---|---|---|---|
| 4,277,875 A | * | 7/1981 | Worrell ................. | E21B 33/038 285/39 |
| 6,494,516 B1 | * | 12/2002 | Bertini .................. | B23P 19/084 294/119.1 |
| 6,666,447 B2 | * | 12/2003 | Keller .................. | B65H 3/0875 271/101 |
| 6,691,860 B2 | * | 2/2004 | Osterfeld ................ | B25B 5/147 198/468.2 |
| 9,068,634 B2 | * | 6/2015 | Cui ........................ | F16H 25/14 |

OTHER PUBLICATIONS

U.S. Appl. No. 15/163,880, filed May 25, 2016, and entitled System for Printing on Three-Dimensional (3D) Objects by Wayne A. Buchar et al.

* cited by examiner

*Primary Examiner* — Stephen A Vu

(57) ABSTRACT

A universal gripper includes a set of pivoting fingers on pins mounted uniformly around a fixed ring. The fingers attached by springs to a movable ring are able to rotate inward, toward the center, until they meet an object and stop. Multiple universal grippers could be stacked to allow for different contours throughout objects and facilitate the pivoting fingers conforming and wrapping around a centerline of the objects. Once the universal gripper fingers are in contact with the surface of the object, they stop moving and springs attached to the fingers elongate as the movable ring continues to move over its full range of motion. An alignment tool can be used for staging and acquiring objects in a repeatable and consistent manner.

20 Claims, 7 Drawing Sheets

SPRING LOADED IRIS MECHANISM STACK GRIPPER

CROSS REFERENCE TO RELATED APPLICATIONS

Cross-referenced is commonly assigned U.S. application Ser. No. 15/477,125, filed Apr. 3, 2017, and entitled VACUUM TUBE OBJECT CLAMPING ARRAY WITH CONFORMABLE PADS by Timothy P. Foley et al; U.S. application Ser. No. 15/477,127, filed Apr. 3, 2017, and entitled APPARATUS FOR HOLDING DURING THREE-DIMENSIONAL (3D) OBJECTS DURING PRINTING THEREON by Jeffrey J. Bradway et al; U.S. application Ser. No. 15/477,126, filed Apr. 3, 2017, and entitled UNIVERSAL PART GRIPPER WITH CONFORMABLE TUBE GRIPPERS by Linn C. Hoover et al; U.S. application Ser. No. 15/477,427, filed Apr. 3, 2017, and entitled SPRING LOADED SUCTION CUP ARRAY GRIPPER by Paul M. Fromm et al; U.S. application Ser. No. 62/480,563, filed Apr. 3, 2017, now expired, and Non-Provisional U.S. application Ser. No. 15/626,200, filed Jun. 19, 2017, and entitled UNIVERSAL OBJECT HOLDER FOR 3-D PRINTING USING A CONFORMABLE GRIPPER BALL by Erwin Ruiz et al; U.S. application Ser. No. 15/477,439, filed, Apr. 3, 2017, and entitled UNIVERSAL PART GRIPPER USING 3-D PRINTED MOUNTING PLATE by Linn C. Hoover et al; U.S. application Ser. No. 15/477,454, filed Apr. 3, 2017, and entitled APPARATUS FOR GENERAL OBJECT HOLDING DURING PRINTING USING MULTIPLE CONFORMABLE BALLS by Jeffrey J. Bradway et al; U.S. application Ser. No. 15/477,464, filed Apr. 3, 2017, and entitled AIR PRESSURE LOADED MEMBRANE AND PIN ARRAY GRIPPER by Paul M. Fromm et al; and U.S. application Ser. No. 15/477,488, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto three-dimensional objects would be difficult. Since the surfaces to be printed must be presented to the print heads as relatively flat, 2-D surfaces, the objects have to be maneuvered carefully to present portions of the articles as parallel planes to the print heads.

One Direct to Object printing system that accomplishes this is disclosed in copending and commonly assigned U.S. patent application Ser. No. 15/163,880, filed on May 25, 2016, now U.S. Pat. No. 9,827,784, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by the 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference to the extent necessary to the practice the present disclosure and in its entirety.

A problem with this approach is that it requires a unique part holder for each part that is to be printed. The part holders are currently machined metal brackets with dedicated locating and fastening features machined into each holder. Unique holders are required for each part.

SUMMARY

In answer to this shortcoming, disclosed is a universal gripper for many types of objects. The universal gripper includes a set of pivoting fingers on pins mounted uniformly around a fixed ring. The fingers are able to rotate on a ring inward, toward the center, until they meet an object and stop. The universal gripper is stackable, allowing multiple gripper units to hold an object, while simultaneously allowing for different contours throughout the object and having the fingers conform and wrap around a centerline of the object. Once the universal gripper fingers are in contact with the surface of the object, they stop moving and springs attached to the fingers elongate as the ring continues to move over its full range of motion. An alignment tool is used for staging and acquiring objects in a repeatable and consistent fashion.

BRIEF DESCRIPTION OF THE DRAWINGS

The foregoing aspects and other features of a printing system that prints images onto 3-D objects are explained in the following description, taken in connection with the accompanying drawings.

FIG. 7 depicts the stacked iris finger grippers in FIG. 6 with separator sheets placed between each layer.

DETAILED DESCRIPTION

Figure 1:
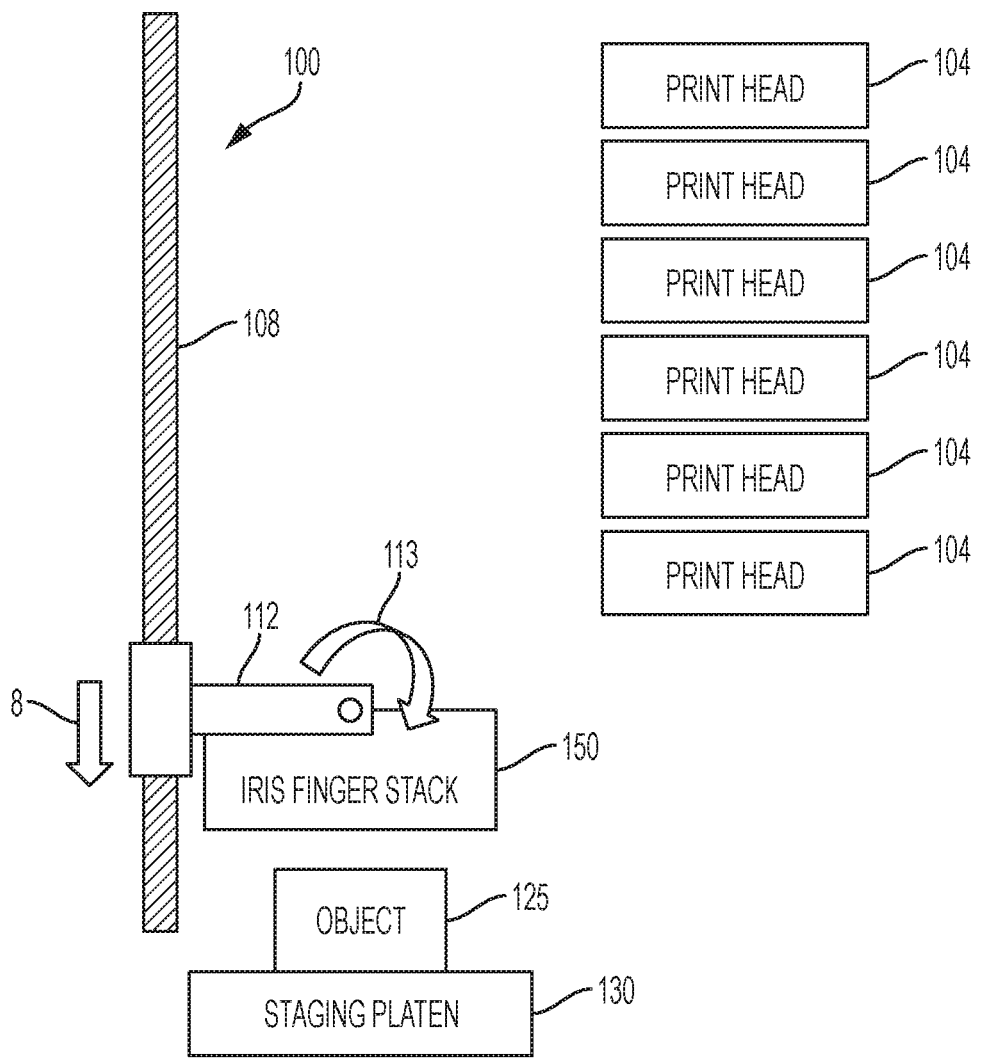
FIG. 1 illustrates an exemplary partial block printing system 100 configured to print on a 3-D object held by a universal gripper.

For a general understanding of the present embodiments, reference is made to the drawings. In the drawings, like reference numerals have been used throughout to designate like elements.

FIG. 1 illustrates an exemplary printing system 100 configured to print on a 3-D object. The printing system 100 includes an array of print heads 104, a support member 108, a member 112 movably mounted to the support member 108 to be moved in the direction of arrow 8 in FIG. 1 and arrow 9 in FIG. 2 and iris gripper 150 configured to pivotally mount to the movably mounted member 112 and adapted to rotate in the direction of arrow 113 to pick up an object. As shown in FIG. 1, the array of print heads 104 is arranged in a two-dimensional array, which in the figure is a 6×1 array, although other array configurations can be used. Each print head is fluidly connected to a supply of marking material (not shown) and is configured to eject marking material received from the supply. Some of the print heads can be connected to the same supply or each print head can be connected to its own supply so each print head can eject a different marking material.

The support member 108 is positioned to be parallel to a plane formed by the array of print heads and, as shown in FIG. 1, is oriented so one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder to enable the object holder to pass objects past the horizontally arranged print heads so the print heads can eject marking material downwardly on the objects.

Figure 2:
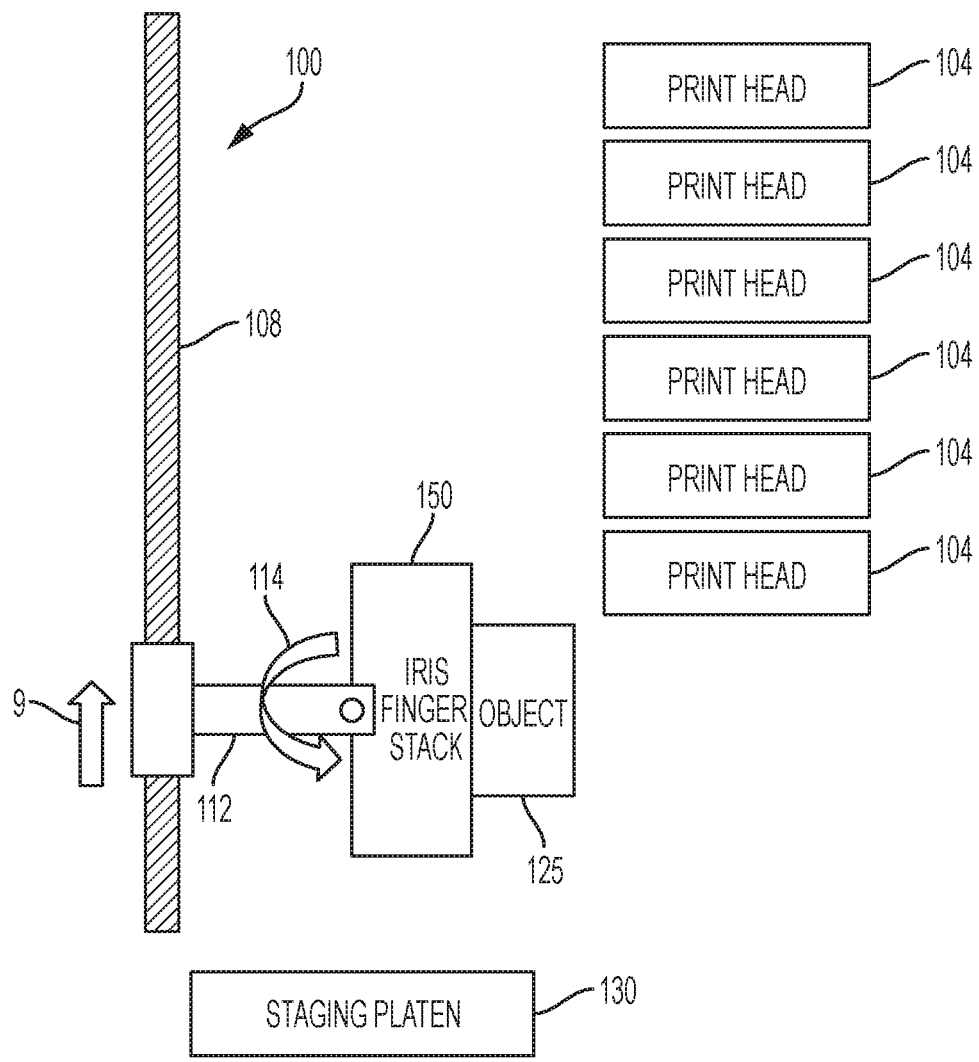
FIG. 2 illustrates the exemplary partial block printing system 100 in FIG. 1 with the universal gripper holding an object in position to receive printing.

The member 112 is movably mounted to the support member 108 to enable the member to slide bi-directionally along the support member. In FIG. 1, the iris finger 150 has been rotated by member 112 through conventional means into a first position or object acquiring positioned that is parallel to staging platen 130. Object 125 has been positioned onto staging platen 130 for acquisition. In FIG. 2, object 125 has been acquired and member 112 has been rotated in the direction of arrow 114 into a second position and member 112 now moves object 125 along the length dimension shown by arrow 9 of the array of print heads 104 by conventional means, such as, with the use of pulleys and belts or a screw drive. A camera 120 in FIG. 3 can be used to ensure consistency and repeatability in staging and acquiring objects. The fingers will tend to move the object to the center of the gripper and some objects may rotate somewhat variably as the gripper closes even when placed consistently on the staging platen 130. The image from camera 120 can be used to move the iris finger stack 150 and thus object 125 to the desired location and rotation, or the data of the image to be printed can be moved to align with the orientation and location of the object 125.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet and installed in non-production outlets. Once installed, iris finger stack 150, as described further below, can be used with the system to print on a variety of goods that are generic in appearance until printed.

Figure 4:
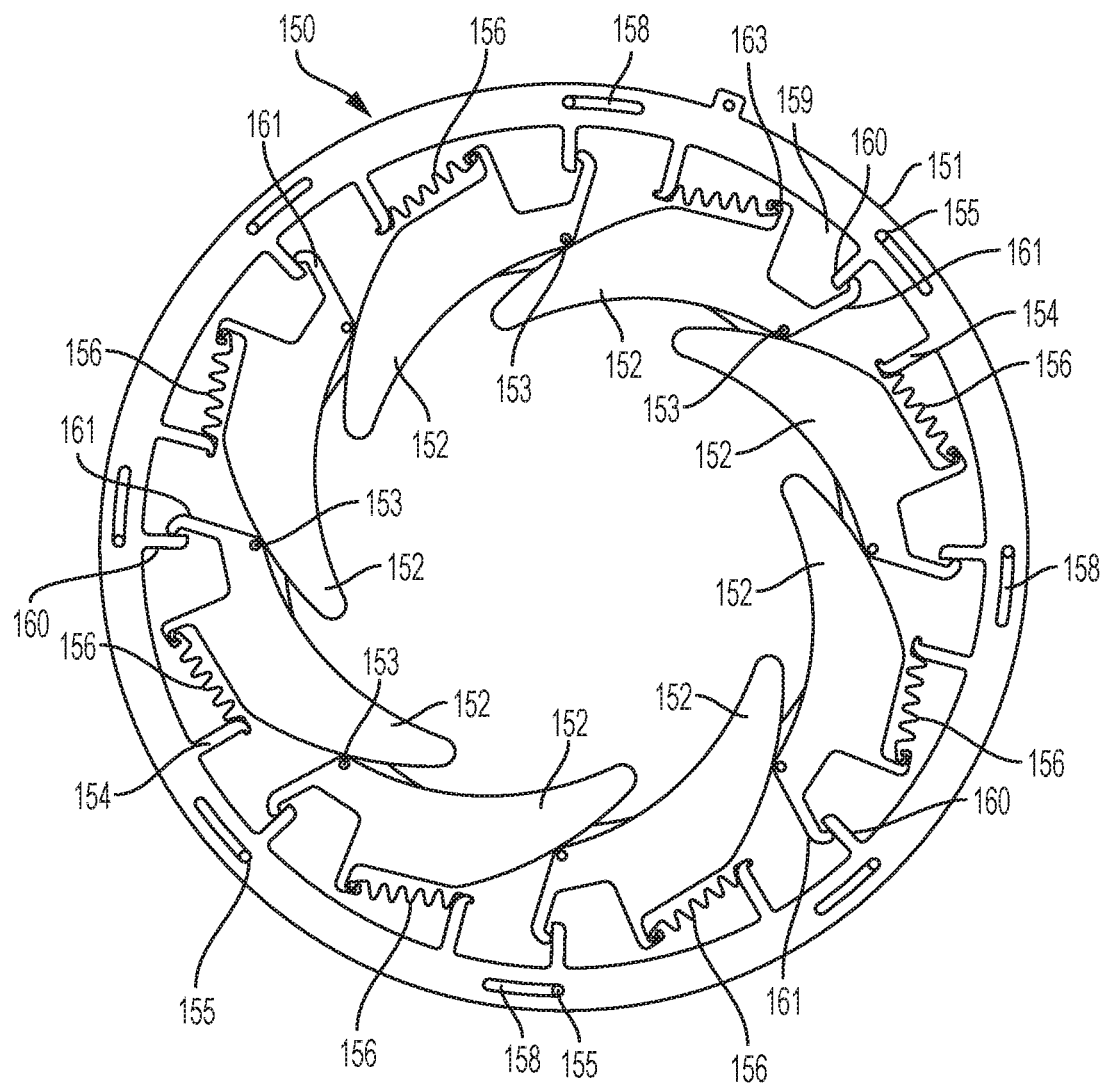
FIG. 4 depicts a plan view of an iris finger gripper in accordance with the present disclosure.

Turning now to the present disclosure, a generic or universal object holder in the form of an iris gripper 150 is shown in FIG. 4 that includes a fixed base member 159 with upstanding studs 155 extending through slots 158 in movable ring 151 that allow movable ring 151 to rotate clockwise and counter-clockwise within slots 158. Slots 158 define the full range of motion of movable ring 151. Jut members 160 protrude from an inside surface of movable ring 151 and are contacted by stop member 161 on a plurality of fingers 152 that are mounted uniformly around fixed base member 159 and pivot on studs 153 extending orthogonally from fixed base member 159. Each of fingers 152 includes a U-shaped end portion with one leg of the U-shaped end portion comprising spring hook 163 connected to a spring 156 and the other leg of the U-shaped end portion stop member 161 contacting a jut member 160. The other end of spring 156 is connected to spring hook member 154 protruding from an inside surface of movable ring 151. The spring 156 applies force to the finger 152 by way of spring hook 163 causing the finger 152 stop member 161 to remain in contact with jut member 160 as ring 151 is rotated and the finger 152 rotates around pivot 153 on the fixed base member 159. When the fingers 152 contact an object preventing the fingers from moving springs 156 elongate and contact between stop member 161 and jut member 160 is lost as movable ring 151 continues to rotate until stopped by slots 158.

Figure 3:
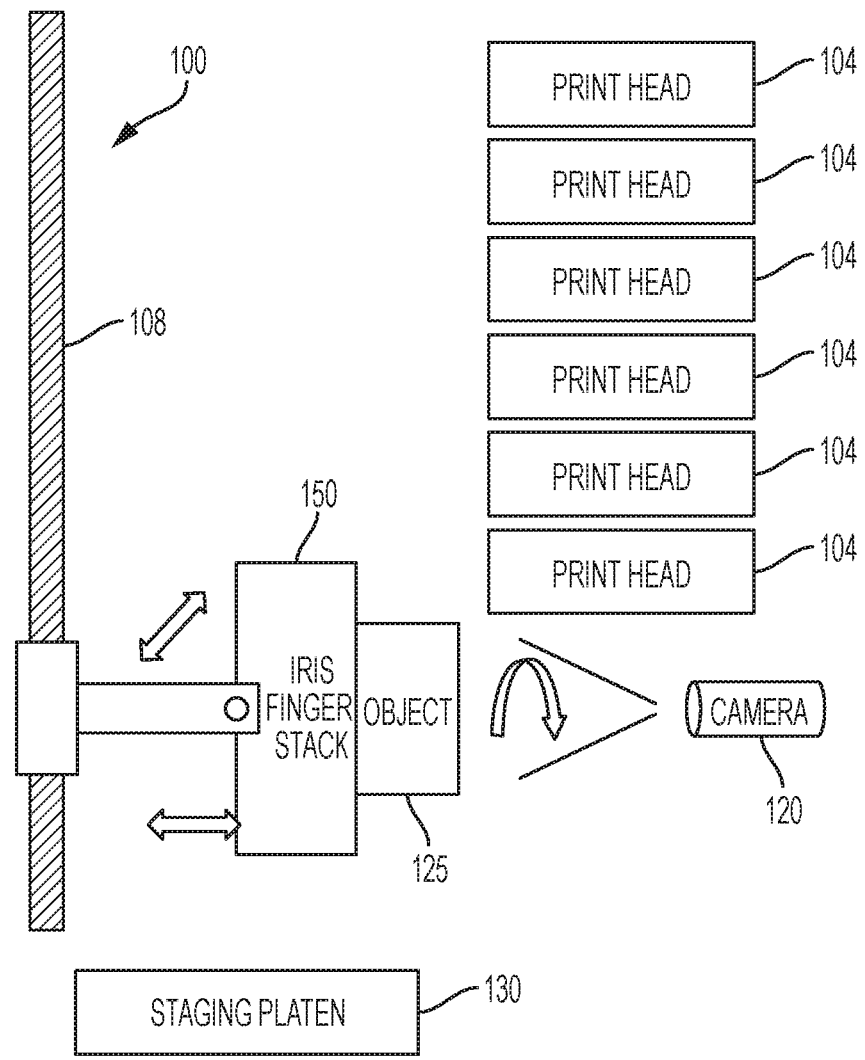
FIG. 3 illustrates the exemplary partial block printing system 100 in FIG. 2 with the universal gripper holding an object in position to receive printing and includes an alignment tool.
Figure 5:
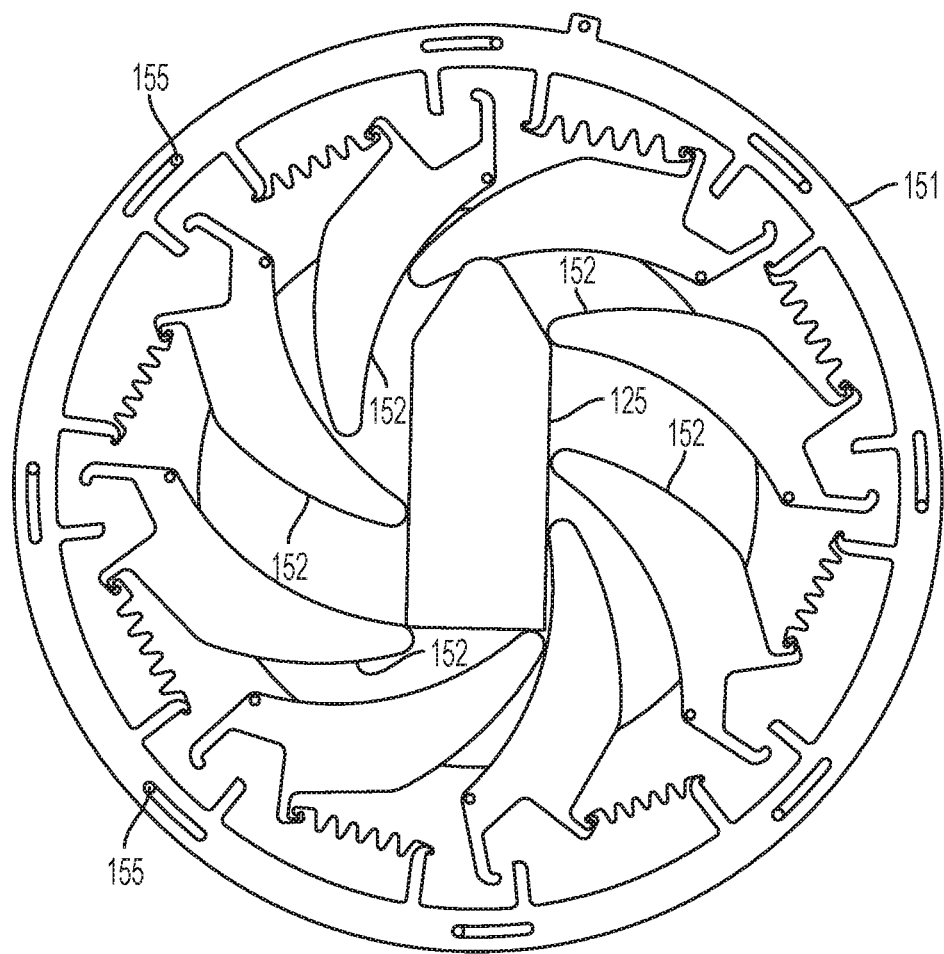
FIG. 5 depicts a plan view of the iris finger gripper in FIG. 4 showing an object captured.

An object 125 is shown being gripped buy fingers 152 in FIG. 5 as moving ring 151 has been moved to its closed stop in slot 158. Fingers 152 are rotated by movement of ring 151 towards the center of fixed ring 159 and stop moving when they contact object 125. Some fingers 152 may stop on other fingers as also shown in FIG. 5. A spring 156 biases each finger 152 against moving ring 151 such that if finger 152 encounters an object it stops moving and the spring elongates as moving ring 151 continues to move over its full range of motion. Objects will move to find the equilibrium force position and in FIG. 5 will likely move to the left. Moving ring 151, fingers 152 and springs 156 are all thin, for example, approximately 1 mm, coplanar and non-overlapping. Springs 156 are in a zig-zag pattern and have a wire diameter of about 50% of finger thickness. After object 125 is gripped, the location of the object relative to iris gripper 150 in FIG. 3 is measured with camera system 120 and iris gripper 150 is moved to position object 125 into the required location for printing.

Figure 6:
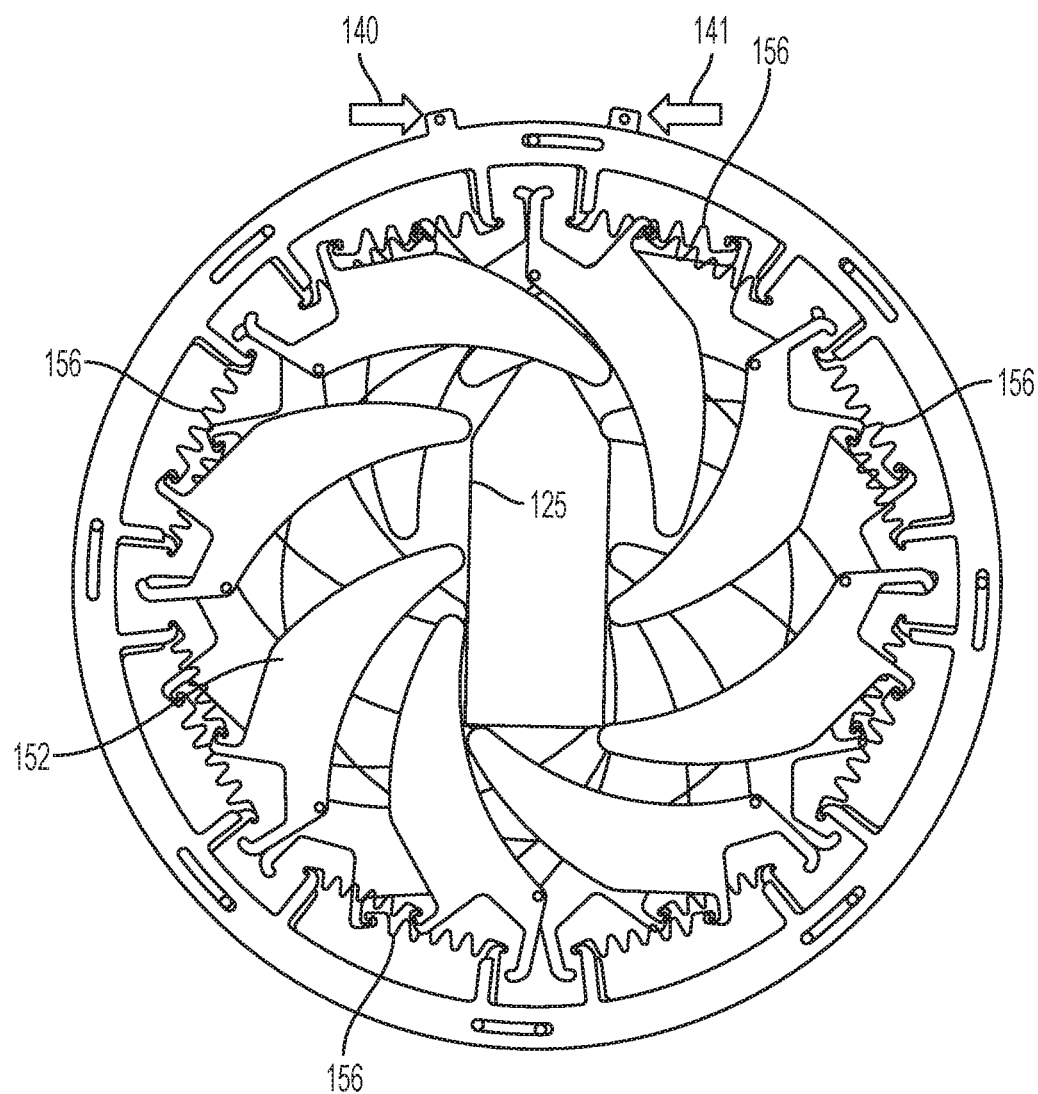
FIG. 6 shows a plan view of stacked iris finger grippers in accordance with the present disclosure.

An alternative embodiment of iris gripper 150 is illustrated in FIGS. 6 and 7 and comprises many iris rings 151 and associated fingers 152 and springs 156 stacked on each other with a separator sheet 157 placed between each layer. Every other ring and associated fingers and springs is flipped over so that each ring and fingers rotate in the opposite direction from the one above it making contact of fingers 152 to object 125 symmetric. Object 125 will tend to move to the center of iris gripper 150. Separator sheet 157 can be a flimsy low friction plastic film or a more rigid metal sheet with a low friction coating. The moving rings 151 are pulled towards each other to close iris gripper 150 as indicated by directional arrows 140 and 141 in FIG. 6. Conventional mechanisms can be used to pull the moving rings 151 towards each other, for example, a stepper motor with gear racks opposite a pinion, cable arrangement wrapped around a drum and spring return or gear teeth on an edge of ring 151 with an even number of gears between a motor pinion on one side and an odd number on the other side. The stack of moving ring, finger and springs assemblies can be many layer thick such as 10 to 30 layers. This provides iris gripper 150 the ability to conform to the contour of object 125 as it changes shape from one layer of the fingers to the next. Also, each finger exerts a small force on the object controlled by details of the spring 156 design. Each layer of fingers increases the total force exerted on the object, thus allowing heavy object to be gripped.

To further increase the gripping and holding capacity of the assembly the edge of the fingers 152 facing the object can be coated with a high friction material such as an elastomer.

In recapitulation, holding a variety of 3-D part sizes for printing thereon is accomplished with an iris gripper that includes a set of fingers pivoting on pins mounted evenly spaced around a fixed ring. The fingers are rotated to move toward the center of the fixed ring by a movable ring. A spring biases each finger against the moving ring such that if the finger encounter an object it stops moving and the spring elongates as the moving ring continues to move over its full range of motion. Multiple rings and fingers can be stacked on top of each other to accommodate different shapes of objects. With rings stacked, every other ring and finger set will be flipped over opposite the other in order for the fingers of all rings to be symmetrical to an object.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A universal gripper unit configured to hold a variety of object shapes and sizes, comprising:
    a fixed base, said fixed base including first and second sets of studs extending orthogonally therefrom;
    a ring having multiple protrusions extending from an inside surface thereof and a series of slots therein and mounted for rotary movement with respect to said fixed base, and wherein said first set of studs of said fixed base extend through said series of slots in said ring; and
    a series of fingers mounted on said second set of studs and all adapted to pivot on said second set of studs only toward a center portion of said ring into an object capturing position upon rotary movement of said ring counterclockwise, and wherein said series of fingers include a first portion positioned to contact said protrusions of said ring during rotation of said ring and a second portion connected to a series of springs with an opposite end of each of said series springs being connected to one of said multiple protrusions.

2. The universal gripper unit of claim 1, wherein said series of slots in said ring define a range of rotary motion of said ring.

3. The universal gripper unit of claim 2, wherein rotation of said ring in one direction causes said series of fingers to pivot on said second set of studs towards a center of said fixed base and rotation of said ring in an opposite direction causes said fingers to pivot away from said center of said fixed base.

4. The universal gripper unit of claim 3, wherein said second set of studs is positioned uniformly around said fixed base.

5. The universal gripper unit of claim 4, wherein said springs bias each of said series of fingers against movement of said ring such that if said series of fingers encounter an object they stop moving and said springs elongate as movement of said ring continues over its range of motion.

6. The universal gripper unit of claim 5, wherein said series of springs pull said series of fingers into contact with said multiple protrusions extending from said ring.

7. The universal gripper unit of claim 1, wherein said universal gripper unit is incorporated into a printer that prints on 3-D objects.

8. The universal gripper unit of claim 1, including multiple layers of rings and fingers and springs positioned on said fixed base and oriented such that alternate layers close clockwise or counter clockwise.

9. The universal gripper unit of claim 8, wherein said multiple layers of rings are pulled towards each other to close said series of fingers and grip an object and pushed away from each other to release the object.

10. An object holder configured to hold a variety of object shapes and sizes, comprising:
    a gripper unit, said gripper unit further comprising:
    a fixed ring;
    a set of pivoting fingers on pins mounted uniformly around said fixed ring;
    a movable ring having multiple protrusions extending from an inside surface thereof and a series of slots therein and mounted for rotary movement with respect to said fixed ring, and wherein said fixed ring includes stop members that extend through said series of slots in said movable ring that define a range of motion of said movable ring; and
    wherein said set of pivoting fingers is adapted such that each finger pivots counterclockwise on studs extending from said fixed ring when contacting an object and includes a first portion positioned to contact said multiple protrusions extending from said inside surface of said movable ring during rotation of said movable ring and a second portion connected to one end of a series of springs with opposite ends of said series of springs connected to predetermined ones of said multiple protrusions.

11. The object holder of claim 10, including multiple stacked gripper units, said multiple stacked gripper units allowing for different contours of objects and facilitating said set of pivoting fingers of each of said multiple stacked gripper units to conform and wraparound said object.

12. The object holder of claim 11, wherein every other of said multiple stacked gripper units are flipped over resulting in said multiple stacked gripper units closing in opposite directions so that contact of each of said set of pivoting fingers with said object is symmetric.

13. The object holder of claim 12, including separator sheets placed between each of said multiple stacked gripper units.

14. The object holder of claim 10, wherein once said set of pivoting fingers are in contact with a surface of an object it stops moving and said set of springs elongates as said movable ring continues to move over said range of motion.

15. The object holder of claim 10, wherein said set of pivoting fingers is adapted to rotate inward towards a centerline through said fixed ring until contacting an object.

16. An apparatus for holding multiple object shapes and sizes, comprising:
   a stationary base, said stationary base including first and second sets of studs extending orthogonally therefrom;
   a rotatable ring having multiple protrusions extending from an inside surface thereof and a series of slots therein that define a range of rotary motion of said rotatable ring, and wherein said first set of studs on said stationary base extend through said series of slots in said rotatable ring; and
   a series of fingers mounted on said second set of studs and adapted to pivot on said second set of studs upon movement of said rotatable ring, and wherein said series of fingers include a first portion positioned to contact said protrusions on said rotatable ring during movement of said rotatable ring, and wherein movement of said rotatable ring in a first direction causes said series of fingers to pivot on said second set of studs towards a center of said stationary base and rotation of said rotatable ring in a second direction causes said series of fingers to pivot away from said center of said stationary base; and
   a series of springs, and wherein said series of fingers include a second portion connected to one end of a said series of springs, said series of springs including a second end connected to predetermined ones of said multiple protrusions and being configured to bias each of said series of fingers against movement of said rotatable ring upon contact of said series of fingers with an object.

17. The apparatus of claim 16, wherein said series of springs elongate when said fingers stop at contact with an object and as movement of said rotatable ring continues over its range of motion within said series of slots.

18. The apparatus of claim 17, wherein said second set of studs is positioned uniformly around said stationary base.

19. The apparatus of claim 18, wherein said series of springs pull said series of fingers into contact with said multiple protrusions extending from said rotatable ring.

20. The apparatus of claim 16, wherein said apparatus is incorporated into a printer that prints on 3-D objects.

* * * * *